US012779383B2

(12) United States Patent
Yang et al.

(10) Patent No.: US 12,779,383 B2
(45) Date of Patent: Nov. 3, 2026

(54) FLY ASH REMOVAL DEVICE FOR FLUE GAS

(71) Applicant: Xi'an Thermal Power Research Institute Co., Ltd, Shaanxi (CN)

(72) Inventors: Xiaogang Yang, Shaanxi (CN); Zhi Luo, Shaanxi (CN); Xiaobing Wang, Shaanxi (CN); Dong Pan, Shaanxi (CN); Kai Shu, Shaanxi (CN); Tong Shang, Shaanxi (CN); Xiaotao Xu, Shaanxi (CN); Chen Dong, Shaanxi (CN); Zhuang Yuan, Shaanxi (CN); Lei Shi, Shaanxi (CN); Shiji Yang, Shaanxi (CN); Shuhong Li, Shaanxi (CN)

(73) Assignee: Xi'An Thermal Power Research Institute Co., Ltd., Xi'An (CN)

( * ) Notice: Subject to any disclaimer, the term of this patent is extended or adjusted under 35 U.S.C. 154(b) by 301 days.

(21) Appl. No.: 18/619,560

(22) Filed: Mar. 28, 2024

(65) Prior Publication Data

US 2025/0214012 A1 Jul. 3, 2025

(30) Foreign Application Priority Data

Jan. 3, 2024 (CN) ......................... 202410006468.5

(51) Int. Cl.

*B01D 45/08* (2006.01)
*B01D 45/18* (2006.01)

(52) U.S. Cl.

CPC ............ *B01D 45/08* (2013.01); *B01D 45/18* (2013.01)

(58) Field of Classification Search

CPC ......... B01D 45/08; B01D 45/18; F23J 15/022
See application file for complete search history.

(56) References Cited

U.S. PATENT DOCUMENTS

2025/0367584 A1* 12/2025 Choi ...................... B01D 45/08

FOREIGN PATENT DOCUMENTS

| | | | |
|---|---|---|---|
| CN | 2793573 | Y | 7/2006 |
| CN | 204840991 | U | 12/2015 |
| CN | 111841155 | A | 10/2020 |
| CN | 211987799 | U | 11/2020 |
| CN | 116688654 | A | 9/2023 |
| FR | 2554737 | A * | 5/1985 |

OTHER PUBLICATIONS

English abstract of FR-2554737-A (Year: 1985).*
Machine translation of CN116688654 (Year: 2023).*
First Office Action for CN application 202410006468.5, mailed Jan. 23, 2025 (14 pages) English and Chinese language translations.
Second Office Action for CN application 202410006468.5, mailed Apr. 17, 2025 (16 pages) English and Chinese language translations.

* cited by examiner

*Primary Examiner* — Robert Clemente

(57) ABSTRACT

Provided is a fly ash removal device for a flue gas, including a fly ash collection assembly adapted to be arranged in a flue. The fly ash collection assembly includes: a flow baffle, a flow guiding component, and a collecting component.

10 Claims, 3 Drawing Sheets

FLY ASH REMOVAL DEVICE FOR FLUE GAS

CROSS-REFERENCE TO RELATED APPLICATIONS

This application is based on and claims priority to the Chinese Patent Application No. 202410006468.5, filed on Jan. 3, 2024, the entire content of which is incorporated herein by reference.

FIELD

The present disclosure relates to the technical field of power generation equipment, in particular to a fly ash removal device for a flue gas.

BACKGROUND

In the thermal power generation system, after a flue gas in a boiler is discharged from an outlet channel of the boiler through an economizer, it is required for the flue gas to pass through a Selective Catalytic Reduction (SCR) denitration device, an air preheater, a low-temperature economizer, a fly ash remover and other equipment. The flue gas will contain a large amount of coarse particles and an increasing concentration of the fly ash, due to coal quality and combustion system, and exhibit obviously severe erosion and abrasion nature, especially when the fly ash is of a particle size exceeding 150 μm, subsequently resulting in the abrasion to downstream equipment of the boiler and causing a huge economic loss.

In the related art, the fly ash removal is performed by a high-temperature electrostatic precipitator and a cyclone separation precipitator, however with a large space taken up.

SUMMARY

The present disclosure aims to solve at least one of the technical problems in the related art to a certain extent.

In view of this, the present disclosure provides in embodiments a fly ash removal device for a flue gas, which takes the advantage of a space of an outlet channel close to the economizer for fly ash removal without an additional space required.

The present disclosure provides in embodiments a fly ash removal device for a flue gas, comprising a fly ash collection assembly adapted to be arranged in a flue, wherein the fly ash collection assembly comprises: a flow baffle having a diversion surface that protrudes towards the flue gas, and having a first end and a second end in its lengthwise direction; a flow guiding component, having a third end and a fourth end in its lengthwise direction, wherein the third end of the flow guiding component is connected to the second end of the flow baffle, such that some particles in the flue gas flowing towards the second end of the flow baffle flow onto the flow guiding component from the diversion surface; and a collecting component, connected to the fourth end of the flow guiding component, to allow the particles flowing along the flow guiding component to enter into the collecting component from the.

In some embodiments, the fly ash removal device comprises a plurality of the fly ash collection assemblies arranged in the flue and spaced apart in a cross section vertical to a direction along which the flue gas flows.

In some embodiments, the flow baffle has the first end and the second end in its lengthwise direction, with the second end connected to the flow guiding component and the first end extending to be above the collecting component of an adjacent fly ash collection assembly, so that some particles in the flue gas flowing towards the first end once the flue gas impacts onto the flow baffle are guided to enter into the collecting component of said adjacent fly ash collection assembly.

In some embodiments, the flow baffle is a curved plate, and the flow guiding component is a curved plate.

In some embodiments, the fly ash collection assembly is provided with a spill-proof component connected to the collecting component and arranged opposite to the flow guiding component.

In some embodiments, the collecting component comprises a collection tank connected to the fourth end of the flow guiding component.

In some embodiments, the collecting component is provided with an fly ash discharge pipe, the collection tank is provide with an fly ash discharge outlet at the bottom, the fly ash discharge pipe has a fifth end connected to the fly ash discharge outlet and a sixth end connected to an external ash delivery system.

In some embodiments, the collecting component is provided with a plurality of flow guiding parts in parallel, each in a substantial V shape forming a decreasing flow-through cross section along the direction that the flue gas flows.

In some embodiments, each flow guiding part in the substantial V shape has two slope arms, and each slope arm of the flow guiding part is of an included angle $\alpha$ ranging from 0 to 40° relative to the direction along which the flue gas flows.

In some embodiments, the fly ash collection assembly is further provided with a flue gas guiding component arranged to be obliquely connected to the collecting component, provided between adjacent two fly ash collection assemblies, and used for guiding the flue gas with fly ash removed.

In some embodiments, the spill-proof component comprises a connecting part and a spill-proof part, wherein the connecting part is connected to the collecting component, and the spill-proof part is connected to the connecting part and arranged to be inclined in a direction towards the flow guiding component above the collecting component.

Figure 1:
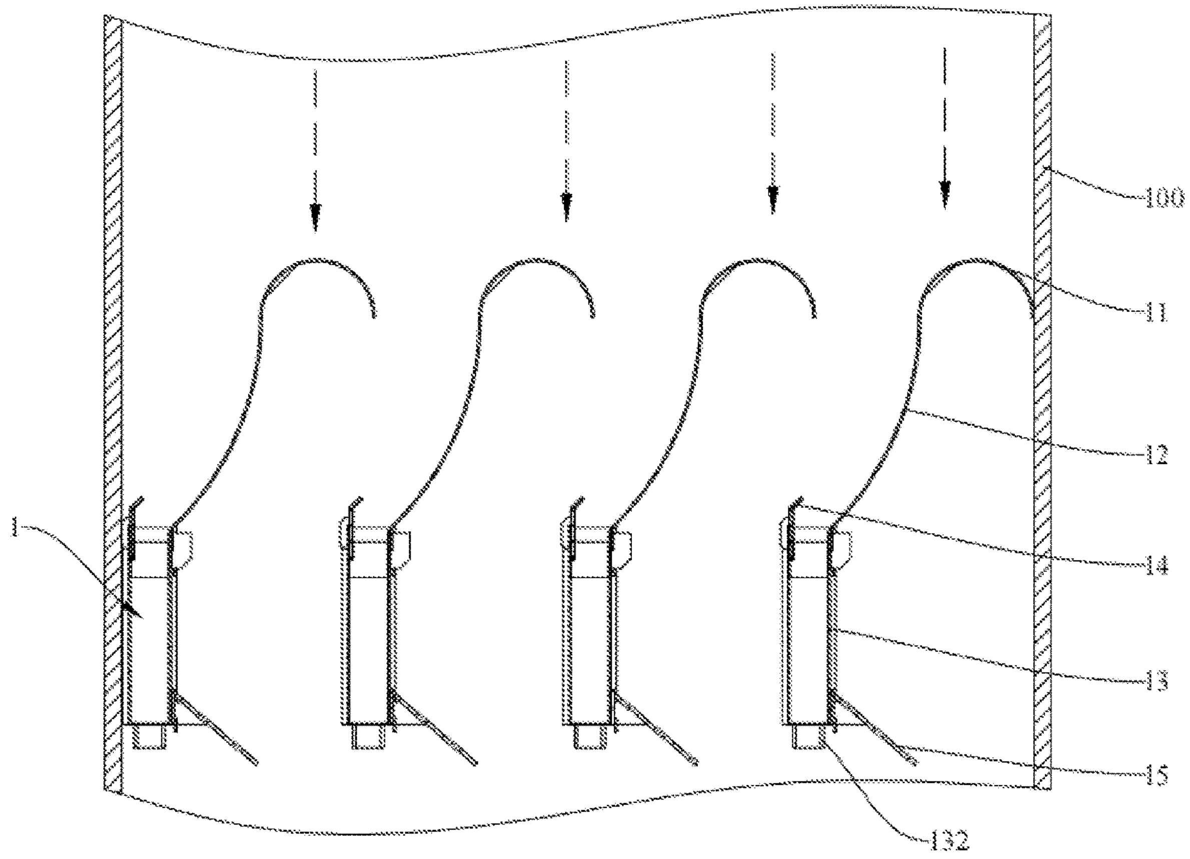
FIG. 1 is a structural schematic diagram of a side-view cross section showing a flue provided with a plurality of fly ash removal devices for a flue gas according to an embodiment of the present disclosure.

REFERENCE SIGNS a flue 100;

a fly ash collection assembly 1; a flow baffle 11; a diversion surface 111; a first end 112; a second end 113; a flow guiding component 12; a collecting component 13; a collection tank 131; an fly ash discharge outlet 1311; an fly ash discharge pipe 132; a flow guiding part 133; a spill-proof component 14; a flue gas guiding component 15.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure.

Figure 2:
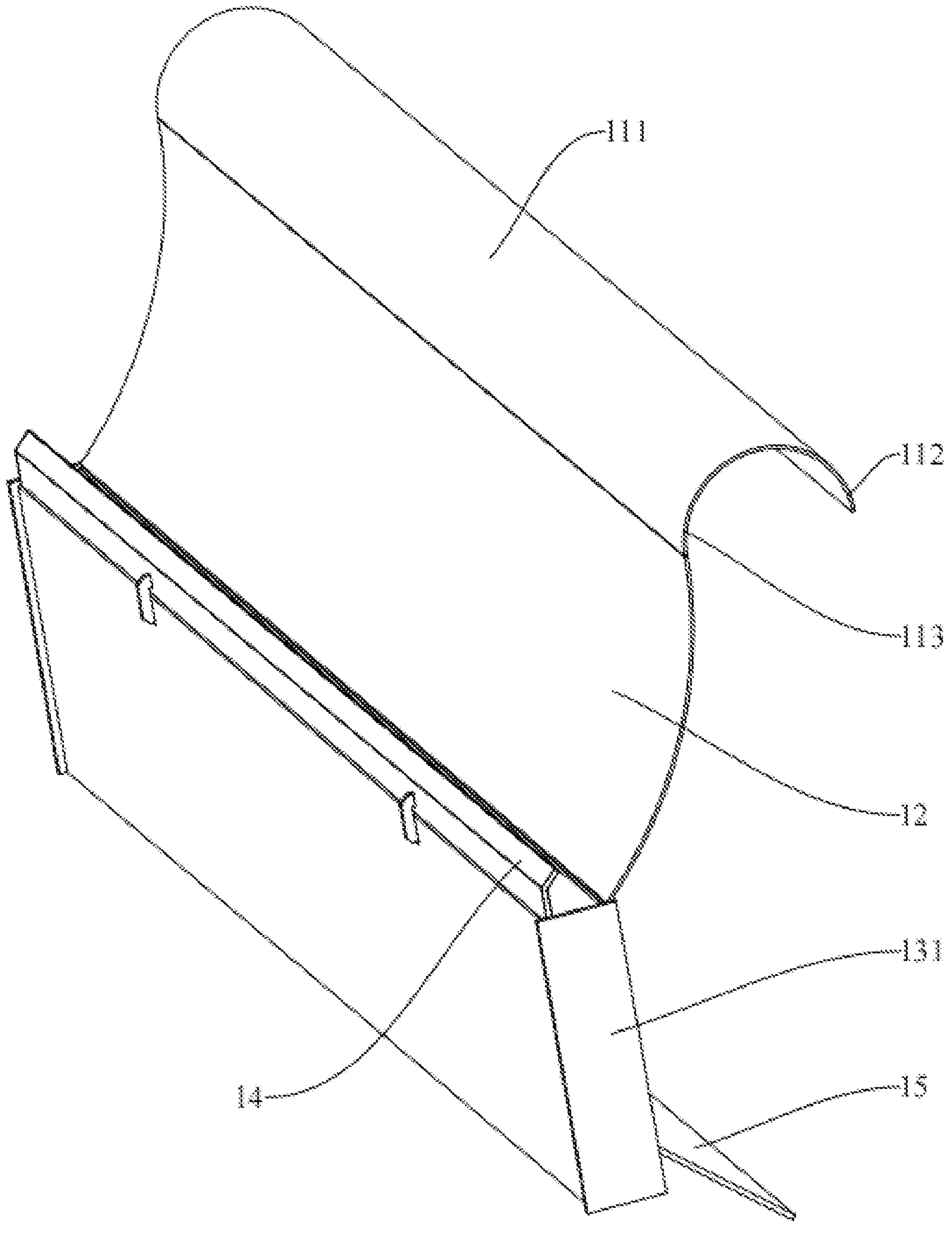
FIG. 2 is a three-dimensional view showing a fly ash collection assembly according to an embodiment of the present disclosure.

As shown in FIG. 1 and FIG. 2, the arrow in FIG. 1 indicates the direction that the flue gas flows. In embodiments, the fly ash removal device for a flue gas includes a fly ash collection assembly 1 adapted to be arranged in a flue 100. The fly ash collection assembly 1 includes a flow baffle 11, a flow guiding component 12 and a collecting component 13. The flow baffle 11 has a diversion surface 111 that protrudes towards the flue gas; and the flow baffle 11 has a first end 112 and a second end 113 in its lengthwise direction. The flow guiding component 12 has a third end and a fourth end in its lengthwise direction, with the third end of the flow guiding component 12 connected to the second end 113 of the flow baffle 11, such that some particles in the flue gas flowing towards the second end 113 of the flow baffle 11 flow onto the flow guiding component 12 from the diversion surface 111. The collecting component 13 is connected to the fourth end of the flow guiding component 12, to allow the particles flowing along the flow guiding component 12 to enter into the collecting component 13.

According embodiments of the present disclosure, the fly ash collection assembly 1 includes the flow baffle 11 having the diversion surface 111 that protrudes towards the flue gas and thus causes the flue gas to flow in deflected directions once impacts onto the flow baffle 11, so that the particles in the flow gas flows towards the first end 112 and the second end 113 of the flow baffle 11 under the inertia and gravity. Some particles in the flue gas flowing towards the second end 113 of the flow baffle 11 are guided by the flow guiding component 12 to fall into the collecting component 13, thus removing fly ash from the flue gas. In an embodiment, the fly ash collection assembly 1 is of a size adapted to be arranged in the flue 100 according to the flue size, without an additional external space required, thus saving space.

In an embodiment, the flow baffle 11 is a curved plate.

It would be understood that, the flow baffle 11 is provided in a curved structure that protrudes towards the flue gas, i.e., the diversion surface 111, which reduces resistance to the flue gas and thus facilitates collection of more particles, there improving the fly ash removal.

In a specific embodiment, the flow baffle 11 is provided in a semi-circular arc shape, which is arranged such that the first end 112 and the second end 113 of the flow baffle 11 are of respective tangent lines in a direction along which the flue gas flows, for convenience of particles falling down from the first end 112 and the second end 113 of the flow baffle 11, thus facilitating collection of more particles.

In an embodiment, the flow guiding component 12 is a curved plate.

In a specific embodiment, the flow guiding component 12 is arranged to extend along a direction tangent to the second end 113 of the flow baffle 11, and is provided as a concave bearing surface that protrudes backwards the flue gas, so that the particles slide smoothly from the second end 113 of the flow baffle 11 to the concave bearing surface of the flow guiding component 12 where the particles are enriched, and the particles then fall from the bearing surface to the collecting component 13.

In an embodiment, the flow baffle 11 and the flow guiding component 12 are integrally molded.

In a specific embodiment, the flow baffle 11 and the flow guiding component 12 are integrally molded, thus facilitating processing of the flow baffle 11 and the flow guiding component 12, without connection therebetween required.

In embodiments, the flow baffle 11 and the flow guiding component 12 are integrally molded by means of stamping, or injection molding.

In an embodiment, as shown in FIGS. 1 and 2, the fly ash collection assembly 1 is provided with a spill-proof component 14 connected to the collecting component 13, and arranged opposite to the flow guiding component 12.

It would be understood that, the spill-proof component 14 is provided to prevent the particles from splashing at an inlet of the collecting component 13 at the end of falling down along the flow guiding component 12, thereby enabling more particles to fall into the collecting component 13, and improving the fly ash removal.

In a specific embodiment, the spill-proof component 14 includes a connecting part and a spill-proof part, wherein the connecting part is connected to the collecting component 13, and the spill-proof part is connected to the connecting part and arranged to be inclined in a direction towards the flow guiding component 12 above the collecting component 13.

In an embodiment, the spill-proof part is connected to the connecting part at an adjustable angle, depending on inclination of the flow guiding component 12 relative to the collecting component 13. For example, the spill-proof part may be connected to the connecting part at a certain angle adapted to the inclination of the fourth end of the flow guiding component 12 connected to the collecting component 13, thus preventing more particles from splashing, thereby allowing more particles to be collected into the collecting component 13.

In a specific embodiment, the spill-proof part and the connecting part are connected in a hinge manner, such that the spill-proof part may be fixed after rotated a preset angle relative to the connecting part, thus preventing more particles from splashing, thereby allowing more particles to be collected into the collecting component 13, and facilitating the fly ash removal. For example, the connecting part and the collecting component 13 are detachably connected by a bolt, so that the spill-proof part is of an adjustable height by changing a height where the connecting part is connected to the collecting component 13, thus improving prevention of splashing by the spill-proof part, thereby facilitating collection of more particles to improve the fly ash removal.

In an embodiment, as shown in FIG. 1 and FIG. 2, the collecting component 13 includes a collection tank 131 connected to the fourth end of the flow guiding component 12.

It would be understood that the collection tank 131 allows for storage of the collected particles and facilitates centralized processing of the collected particles.

In some embodiments, the collection tank 131 are a rectangular tank, a circular tank or a V-shaped tank.

Figure 3:
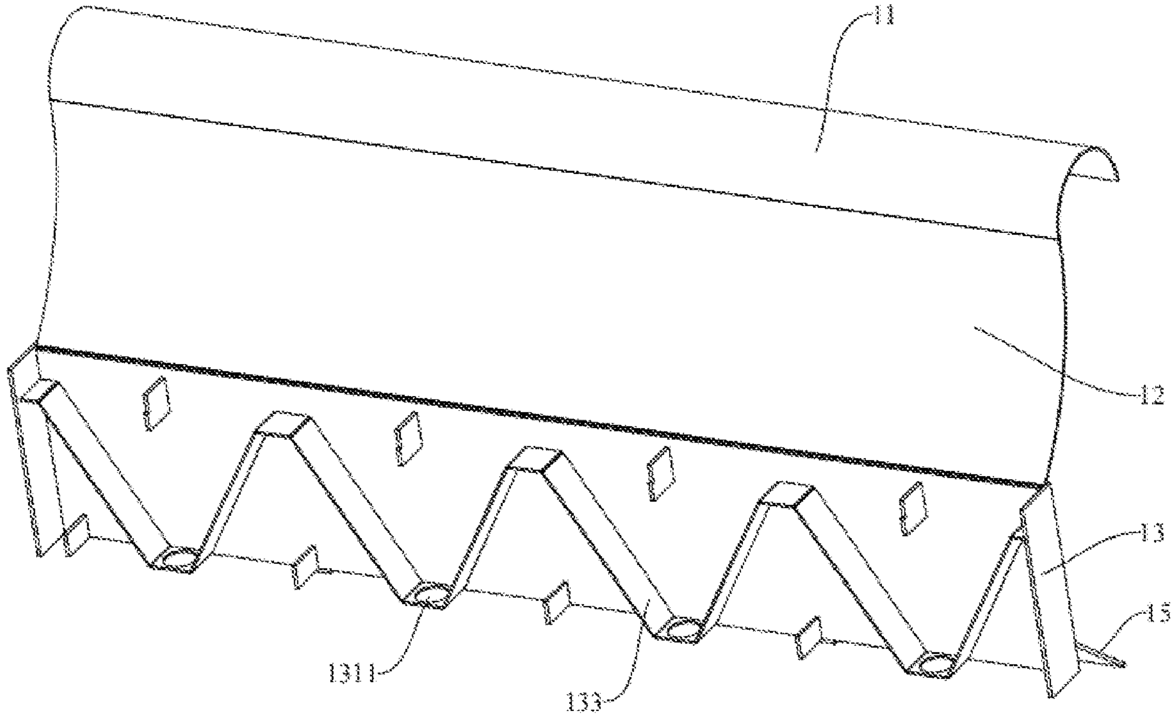
FIG. 3 is a three-dimensional view showing the fly ash collection assembly with a side wall of a collection tank removed according to an embodiment of the present disclosure.

In an embodiment, as shown in FIG. 1 and FIG. 3, the collecting component 13 is provided with an fly ash discharge pipe 132, the collection tank 131 is provide with an fly ash discharge outlet 1311 at the bottom, and the fly ash discharge pipe 132 has a fifth end connected to the fly ash discharge outlet 1311 and a sixth end connected to an external ash delivery system.

It would be understood that, the fly ash discharge pipe 132 is provided through which the particles collected in the collection tank 131 is discharged to the external ash delivery system to output for further processing. Besides, the particles collected in the collecting component 131 are cleaned up in time through the fly ash discharge pipe 132, thus avoiding the particles collected in the collecting component 131 from overflow. In addition, it is not required to take out the collecting component 131 and then to discharge the particles from the collecting component 131 by an operator, thus reducing labor intensity for the operator, and achieving continue fly ash removal.

In some embodiments, the collection tank 131 is provide with a plurality of the fly ash discharge outlets 1311. In some embodiments, the plurality of the fly ash discharge outlets 1311 are arranged in one or more rows at the bottom. In a specific embodiment, the plurality of the fly ash discharge outlets 1311 are arranged to be evenly distributed at the bottom of the collection tank 131, thus facilitating even and sufficient discharge of the fly ash collected in the collection tank 131.

In an embodiment, as shown in FIG. 3, the collecting component 13 is provided with a plurality of flow guiding parts 133 in parallel, each in a substantial V shape forming a decreasing flow-through cross section along the direction that the flue gas flows.

It would be understood that, the flow guiding part 133 is arranged to guide how the particles flow in the collecting component 131; each flow guiding part 133 is arranged to be in the substantial V shape, forming the decreasing flow-through cross section along the direction that the flue gas flows (i.e, towards the fly ash discharge outlet 1311), thus enabling the particles to fallen into the collecting component 13 to fall down smoothly along the flow guiding part 133, thereby preventing the particles from being clogged in the collection tank 131.

In a specific embodiment, each flow guiding part 133 in the substantial V shape has two slope arms; respective lower ends of the slope arms are connected to the bottom of the collecting component 131 with the fly ash discharge outlet 1311 located between the lower ends; and respective upper ends of the slope arms incline away from this fly ash discharge outlet 1311 along a direction vertical to the direction the flue gas flows, thus forming the decreasing flow-through cross section along the direction that the flue gas flows (i.e, towards the fly ash discharge outlet 1311).

Figure 4:
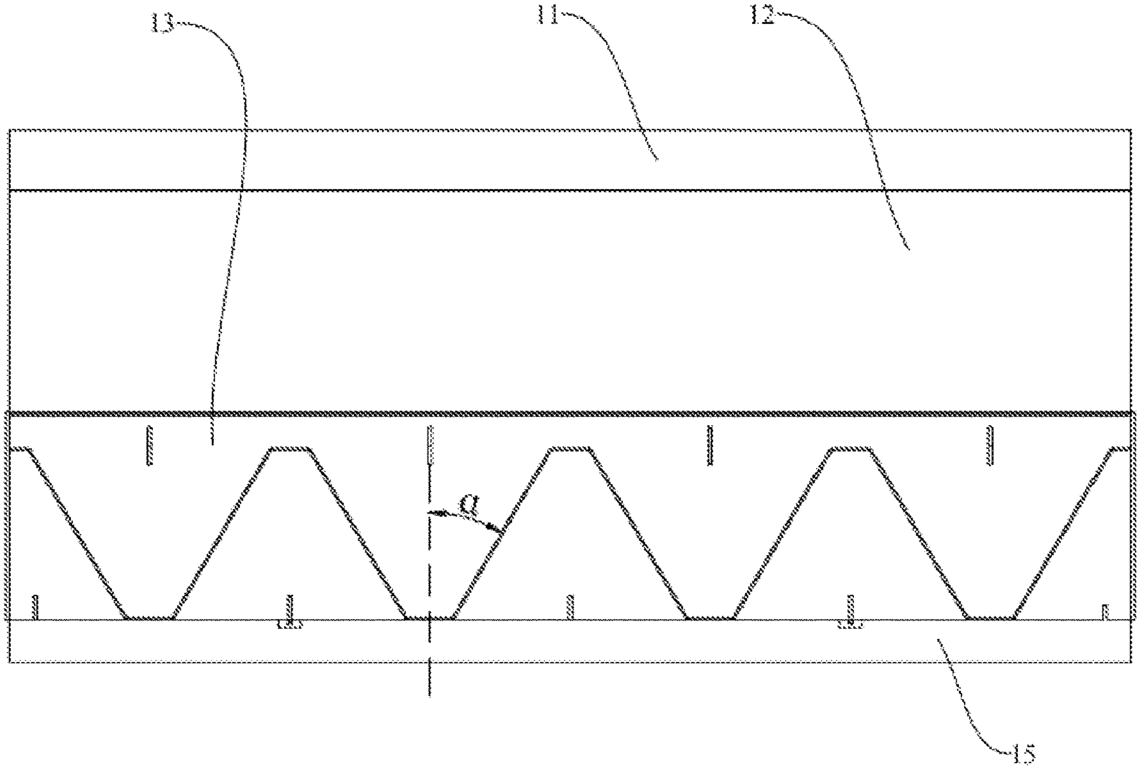
FIG. 4 is a structural schematic diagram of a side view showing the fly ash collection assembly with the side wall of the collection tank removed according to an embodiment of the present disclosure.

In an embodiment, as shown in FIG. 3 and FIG. 4, each slope arm of the flow guiding part 133 is of an included angle $\alpha$ relative to the direction along which the flue gas flows. In an embodiment, the included angle $\alpha$ ranges from 0 to 40°, thus enabling the particles to smoothly fall down along the slope arms of the flow guiding part 133, thereby facilitating timely discharge of the particles, and preventing the flow guiding part 133 from being blocked by the particles at the slope arm.

For example, the included angle $\alpha$ may be 5°, 10°, 15°, 20°, 25°, 30°, 35° or 40°. The particles sliding along the slope arm with an over large included angle of the flow guiding part 133 will not smoothly fall down to the fly ash discharge outlet 1311, leading to internal blockage on the flow guiding part 133, so that the collection tank 131 is incapable of continue collection of the particles once the flow guiding part 133 is full of the blocked particles, which is not conducive to improving the effect of ash removal.

In an embodiment, the fly ash removal device for a flue gas includes a plurality of the fly ash collection assemblies 1 arranged in the flue and spaced apart in a cross section vertical to a direction along which the flue gas flows.

In an embodiment, the flue 100 is of a rectangle cross section vertical to the direction along which the flue gas flows, and the fly ash collection assemblies 1 are spaced apart in the rectangle cross section along its length or width direction, or arranged in an array in the cross section. In another embodiment, the flue 100 is of a circular cross section vertical to the direction along which the flue gas flows, and the fly ash collection assemblies 1 are arranged along a radial direction of the flue 100.

In an embodiment, the fly ash collection assemblies 1 are arranged to be evenly distributed in the cross section of the flue 100 vertical to the direction along which the flue gas flows, so that particles are uniformly collected from the flue gas flowing through the fly ash removal device.

It would be appreciated that the fly ash collection assemblies 1 are spaced apart in the cross section of the flue 100 vertical to the direction along which the flue gas flows, enabling the cross section of the flue 100 is covered with the fly ash collection assemblies 1, thereby improving the fly ash removal from the flue gas.

In an embodiment, the flow baffle 11 has the first end 112 and the second end 113 in its lengthwise direction, with the second end 113 connected to the flow guiding component 12, and the first end 112 extending to be above the collecting component 13 of the adjacent fly ash collection assembly 1, so that some particles in the flue gas flowing towards the first end 112 once the flue gas impacts onto the flow baffle 11 are guided to fall into the collecting component 13 of the adjacent fly ash collection assembly 1.

In an embodiment, the fly ash collection assemblies are arranged in parallel, as shown in FIG. 1, from left to right, the first end 112 of the flow baffle 11 of the first fly ash collection assembly 1 extends to be above the collecting component 13 of the second fly ash collection assembly 1; the first end 112 of the flow baffle 11 of the second fly ash collection assembly 1 extends to be above the collecting component 13 of the third fly ash collection assembly 1, and so on in the similar way.

It would be understood that the flue gas is diverted to both the first end 112 and the second end 113 once the flue gas impacts onto the flow baffle 11, so that some particles in the flow gas flowing towards the second end 113, which is connected to the flow guiding component 12, are guided to fall along the flow guiding component 12 and then enter into the collecting component 13 of the collecting component 13 belonging to the same fly ash collection assembly 1; while some particles in the flue gas flowing towards the first end 112, which extends to be above the collecting component 13 of the adjacent fly ash collection assembly 1, are guided to fall into the collecting component 13 of the adjacent fly ash collection assembly 1, whereas the flue gas with the fly ash removed flows downstream of the flue 100 through a gap between adjacent fly ash collection assemblies.

In an embodiment, as shown in FIG. 1 and FIG. 2, the fly ash collection assembly 1 is further provided with a flue gas guiding component 15 arranged to be obliquely connected to the collecting component 13, provided between adjacent two fly ash collection assemblies 1, and used for guiding the flue gas with the fly ash removed.

It would be understood that, the flue gas guiding component 15 is provided between two adjacent fly ash collection assemblies 1, enabling the flue gas flowing through adjacent fly ash collection assemblies to be deflected, thus allowing the flue gas with fly ash removed to flow downstream smoothly, thereby achieving overall smooth flow of the flue gas in the flue 100, and further improving the fly ash removal.

In an embodiment, the flue gas guiding component 15 is connected to a lower end of an outer wall of the collecting component 13, thus facilitating installation of the flue gas guiding component 15 and enabling the flue gas with the fly ash removed to flow through the gap between adjacent fly ash collection assemblies smoothly downstream.

In an embodiment, the flue gas guiding component 15 is arranged to be obliquely connected to the lower end of the outer wall of the collecting component 13 at an adjustable angle, resulting in changeable resistance to the upstream flue gas, thereby facilitating better fly ash removal.

In an embodiment, the flue gas guiding component 15 is connected to the collecting component 13 in a hinge manner, such that the flue gas guiding component 15 may be fixed after rotated a certain angle relative to the collecting component 13, alternatively the flue gas guiding component 15 is rotated a certain angle relative to the collecting component 13 by an actuator, such as an electric actuator and an air actuator.

In the related art, the fly ash removal is performed by a high-temperature electrostatic precipitator and a cyclone separation precipitator, with disadvantages including: a large space taken up; a large resistance e.g., 300 pa or above for the high-temperature electrostatic precipitator and 1000 pa or above for the cyclone separation precipitator, which adversely and largely affects the flow field at the space of the outlet channel close to the economizer in the SCR denitration device; and large energy consumption for the high-temperature electrostatic precipitator. According to embodiments of the present disclosure, the fly ash removal device for a flue gas only gives resistance of 100 pa or above when performing the fly ash removal, without additional electric energy consumed, besides, the fly ash removal device for a flue gas is arranged in the flue 100 according to the flue size, without an additional external space required, thus saving space.

In the specification, it should be understood that, the terms indicating orientation or position relationship such as "central", "longitudinal", "lateral", "width", "thickness", "above", "below", "front", "rear", "right", "left", "vertical", "horizontal", "top", "bottom", "inner", "outer", "clockwise", "counter-clockwise", "axial", "radial", "circumferential" should be construed to refer to the orientation or position relationship as then described or as shown in the drawings. These terms are merely for convenience and concision of description and do not alone indicate or imply that the device or element referred to must have a particular orientation or must be configured or operated in a particular orientation. Thus, it cannot be understood to limit the present disclosure.

In addition, terms such as "first" and "second" are used herein for purposes of description and are not intended to indicate or imply relative importance or significance or impliedly indicate quantity of the technical feature referred to. Thus, the feature defined with "first" and "second" may comprise one or more this features. In the description of the present disclosure, "a plurality of" means two or more than two this features, unless specified otherwise.

In the present disclosure, unless specified or limited otherwise, the terms "mounted", "connected", "coupled", "fixed" and the like are used broadly, and may be, for example, fixed connections, detachable connections, or integrated connections; may also be mechanical or electrical connections; may also be direct connections or indirect connections via intervening structures; may also be inner communications of two elements or mutual interaction between two elements, which can be understood by those skilled in the art according to specific situations.

In the present disclosure, unless specified or limited otherwise, a structure in which a first feature is "on" or "below" a second feature may be an embodiment in which the first feature is in direct contact with the second feature, or an embodiment in which the first feature and the second feature are contacted indirectly via an intermediation. Furthermore, a first feature "on", "above" or "on top of" a second feature may include an embodiment in which the first feature is right or obliquely "on", "above" or "on top of" the second feature, or just means that the first feature is at a height higher than that of the second feature; while a first feature "below", "under" or "on bottom of" a second feature may include an embodiment in which the first feature is right or obliquely "below", "under" or "on bottom of" the second feature, or just means that the first feature is at a height lower than that of the second feature.

Reference throughout this specification to "an embodiment", "some embodiments", "one embodiment", "another example", "an example", "a specific example" or "some examples" means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in another example", "in an example", "in a specific example" or "in some examples", in various places throughout this specification are not necessarily referring to the same embodiment or example of the present disclosure. Furthermore, the particular features, structures, materials, or characteristics may be combined in any suitable manner in one or more embodiments or examples. Besides, any different embodiments and examples and any different characteristics of embodiments and examples may be combined by those skilled in the art without contradiction.

Although explanatory embodiments have been shown and described, it would be appreciated by those skilled in the art that the above embodiments cannot be construed to limit the present disclosure, and changes, alternatives, and modifications can be made in the embodiments in the scope of the present disclosure.

What is claimed is:

1. A fly ash removal device for a flue gas, comprising a fly ash collection assembly adapted to be arranged in a flue, wherein the fly ash collection assembly comprises:

a flow baffle having a diversion surface that protrudes towards the flue gas, and having a first end and a second end in its lengthwise direction;

a flow guiding component, having a third end and a fourth end in its lengthwise direction, wherein the third end of the flow guiding component is connected to the second end of the flow baffle, such that some particles in the flue gas flowing towards the second end of the flow baffle flow onto the flow guiding component from the diversion surface; and a collecting component, connected to the fourth end of the flow guiding component, to allow the particles flowing along the flow guiding component to enter into the collecting component, wherein the fly ash collection assembly is provided with a spill-proof component connected to the collecting component and arranged opposite to the flow guiding component.

2. The fly ash removal device of claim 1, wherein the fly ash removal device comprises a plurality of the fly ash collection assemblies arranged in the flue and spaced apart in a cross section vertical to a direction along which the flue gas flows.

3. The fly ash removal device of claim 2, wherein the flow baffle has the first end and the second end in its lengthwise direction, with the second end connected to the flow guiding component and the first end extending to be above the collecting component of an adjacent fly ash collection assembly, so that some particles in the flue gas flowing towards the first end once the flue gas impacts onto the flow baffle are guided to enter into the collecting component of said adjacent fly ash collection assembly.

4. The fly ash removal device of claim 1, wherein the flow baffle is a curved plate, and the flow guiding component is a curved plate.

5. The fly ash removal device of claim 1, wherein the collecting component comprises a collection tank connected to the fourth end of the flow guiding component.

6. The fly ash removal device of claim 5, wherein the collecting component is provided with a fly ash discharge pipe, the collection tank is provided with a fly ash discharge outlet at the bottom, the fly ash discharge pipe has a fifth end connected to the fly ash discharge outlet and a sixth end connected to an external ash delivery system.

7. The fly ash removal device of claim 6, wherein the collecting component is provided with a plurality of flow guiding parts in parallel, each in a substantial V shape forming a decreasing flow-through cross section along the direction that the flue gas flows.

8. The fly ash removal device of claim 7, wherein each flow guiding part in the substantial V shape has two slope arms, and each slope arm of the flow guiding part is of an included angle α ranging from 0 to 40° relative to the direction along which the flue gas flows.

9. The fly ash removal device of claim 1, wherein the fly ash collection assembly is further provided with a flue gas guiding component arranged to be obliquely connected to the collecting component, provided between adjacent two fly ash collection assemblies, and used for guiding the flue gas with fly ash removed.

10. The fly ash removal device of claim 1, wherein the spill-proof component comprises a connecting part and a spill-proof part, wherein the connecting part is connected to the collecting component, and the spill-proof part is connected to the connecting part and arranged to be inclined in a direction towards the flow guiding component above the collecting component.

* * * * *